United States Patent
Cromer et al.

(10) Patent No.: US 7,082,129 B2
(45) Date of Patent: Jul. 25, 2006

(54) SECURE METHOD AND SYSTEM TO PREVENT EXTERNAL UNAUTHORIZED REMOTELY INITIATED POWER UP EVENTS IN COMPUTER

(75) Inventors: Daryl Carvis Cromer, Apex, NC (US); Joseph Wayne Freeman, Raleigh, NC (US); Chad Lee Gettelfinger, Durham, NC (US); Steven Dale Goodman, Raleigh, NC (US); Eric Richard Kern, Durham, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 10/134,936

(22) Filed: Apr. 29, 2002

(65) Prior Publication Data
US 2003/0202514 A1    Oct. 30, 2003

(51) Int. Cl.
*H04L 12/28* (2006.01)
(52) U.S. Cl. .................................. 370/389; 455/343.2
(58) Field of Classification Search ................ 370/394, 370/389, 349; 455/343.2, 343.1, 574; 709/203, 709/208
See application file for complete search history.

(56) References Cited

U.S. PATENT DOCUMENTS

| | | | |
|---|---|---|---|
| 4,955,018 A | 9/1990 | Twitty et al. | |
| 4,969,146 A | 11/1990 | Twitty et al. | |

(Continued)

OTHER PUBLICATIONS

D. Cromer, D. Desai, B. Gould, R. Johnson, R.D. Johnson, H. Locker and D. Rhoades, Definition of a Global Wake on Local Area Network Frame, IBM Technical Disclosure Bulletin, Dec. 1996, pp. 41-42, vol. 39, No. 12.

*Primary Examiner*—Brenda Pham
(74) *Attorney, Agent, or Firm*—J. Bruce Schelkopf; Jeanine Ray-Yarletts; Dillon & Yudell LLP

(57) ABSTRACT

In a computer network including a plurality of interconnected computers, one of the computers being a sleeping computer in a power down state, the sleeping computer listening for a packet associated with the sleeping computer, a method and system of waking the sleeping computer from the computer network. An incoming packet of data is transmitted from one of the computers in the network to the sleeping computer. When the sleeping computer detects the incoming packet, it determines if the incoming packet contains a data sequence associated with the sleeping computer. Further, the sleeping computer compares a transit value in the incoming packet to a predetermined value stored at the sleeping computer. The transit value indicates how far the data packet has traveled through the network, indicating the approximate origin of the data packet. Knowing the approximate origin of the data packet allows the client system to identify if the data packet originated from an external network. The predetermined value represents an origin within the internal network. Accordingly, if the incoming packet matches the particular data sequence associated with the sleeping computer, and the transit value in the packet matches the predetermined value stored at the sleeping computer, then a signal is issued to wake the sleeping computer. Otherwise, the incoming packet is discarded and the sleeping computer is not awaken.

12 Claims, 4 Drawing Sheets

U.S. PATENT DOCUMENTS 5,802,305 A * 9/1998 McKaughan et al. ....... 709/227
5,826,015 A * 10/1998 Schmidt ...................... 726/23
6,049,885 A * 4/2000 Gibson et al. .............. 713/324
6,286,111 B1 9/2001 Snover

* cited by examiner

SECURE METHOD AND SYSTEM TO PREVENT EXTERNAL UNAUTHORIZED REMOTELY INITIATED POWER UP EVENTS IN COMPUTER

BACKGROUND OF THE INVENTION

1. Technical Field

This invention relates generally to network computing systems, more particularly, to an improved method and system for remotely waking a computer from a network, and still more particularly to an improved method and system for remotely waking a computer from a network wherein the likelihood of an unauthorized remotely initiated wake up is diminished.

2. Description of the Related Art

Computer networks are commonly used in offices or corporate environments to interconnect personal computers. Well-known local area networks (LANs), such as Ethernet, Token Ring and ARCnet, are widely used to connect a group of computers and other devices that are dispersed over a relatively limited area, such as an office or building, and new LANs continue to be developed. These local area networks provide an efficient and economical way for personal computers to share information and peripherals.

Of course, computer networks are not limited to the confines of an office or building. Smaller networks are commonly interconnected into wide area networks (WANs), such as the Internet, to provide a communications link over a larger area. The Internet is actually a collection of networks that share the same namespace and use the TCP/IP protocols. Originally developed for the military in 1969, the Internet now connects over four hundred networks and tens of thousands of nodes in over forty-two countries. It is estimated that the Internet is now accessed by more than 10 million people every day, and that perhaps as many as 513 million people have access to the Internet.

As is well known in the art, the transmission of data packets across networks is governed by a set of rules called "transport protocols." In order for two computers in a local area network to communicate with one another, each computer must use the proper transport protocol for the particular network. During the last decade, many different transport protocols have evolved for different networks. For example, TCP/IP is the transport protocol widely used in UNIX-based networks and with Ethernet 802.3 LANs; IPX/SPX is the transport protocol used by Novell Corporation's NetWare software; NetBEUI is the local-area transport protocol developed by IBM to operate underneath Microsoft's NetBIOS network interface; DECnet is the transport protocol used by Digital Equipment Corporation for linking computer systems to DECnet-based networks; AppleTalk is the transport protocol developed by Apple Computer, Inc. for linking computer systems to Apple Macintosh network systems; and XNS is the transport protocol developed by Xerox Corporation that was used in early Ethernet networks. These transport protocols, which are all well known in the art, are often implemented as drivers which can be loaded into and removed from a computer system.

Networks, such as the Internet, continue to grow in size. Often network size increases when one network, such as a LAN, connects to another network, such as another LAN or the Internet, using a router or other similar means. As a result of the increasing size, redundant paths are created for data to travel on the network. The redundant paths may create a "routing loop" where a packet, while in transit across the network, is sent by one router to a router that previously had seen the packet. If a packet entered a routing loop, the packet could conceivable exists on the network forever. To prevent endless circulation, the IP protocol uses a time-to-live (TTL) counter in the packet. Each time a packet reaches a router the TTL is reduced by one. The machine transmitting a packet has no control over the behavior of the TTL as the packet travels across the network. When the TTL reaches zero, the router drops the packet.

In order to connect to a network, a computer is usually provided with one or more network interface cards that provide a data link to the network. Each network interface card has a unique address, referred to herein as its "destination address," which enables each computer to be individually addressed by any other computer in the network. The destination address is typically, but not always, a 12 digit hexadecimal number (e.g., 00AA00123456) that is programmed into non-volatile memory located on the network interface card and is generally hidden from the user's view.

The destination address of a computer is analogous to a person's social security number in that, although every person in the country is assigned a unique social security number, it is generally not known to other people and rarely used in normal communications. Likewise, the destination address of a computer is a more primitive means of identifying the computer, and users are not expected to know and remember the destination address of every computer in the network. Instead, every computer generally has a computer name (commonly corresponding to the user's name and/or machine location) that is more widely known. When a user desires to send a message to another computer, the transport protocol in the network is responsible for converting the computer name into the corresponding destination address to facilitate communicating between the two computers.

Because wide area networks (WANs) often include a collection of a wide variety of machines, organizations and individuals, these networks must provide the means to exchange data between dissimilar machines and across many different transport protocols. To accomplish this, each transport protocol has its own layer of addressing information that enables it to exchange electronic mail, data files, programs, etc. between one LAN and another LAN. As a data packet is transmitted across different networks, the addressing information for one transport protocol is layered upon the addressing information for the next transport protocol.

Therefore, the address of an individual, computer, or organization on the Internet has several layers or components including the domain name or user name, the underlying identifiers used by the transport protocol(s) that govern the data exchange, and the actual destination address. Each transport protocol is designed to extract the appropriate destination address to ensure that each message packet is routed to its intended recipient.

To illustrate the distinctions between the various layers of addressing information, consider an individual computer user in Atlanta who wishes to send an e-mail message to a destination computer in Seattle where the computer in Atlanta is connected to an Internet service provider and the computer in Seattle is connected to a corporate local area network. Generally, the user in Atlanta will know, or can readily obtain, the recipient's computer name (e.g., www.recipient.com), but will not know the recipient's Internet address or actual destination address. Nonetheless, the transport protocols will abstract the destination address from the message packet as it is transmitted across the network.

Therefore, the user in Atlanta will simply type the recipient's computer name, www.recipient.com, as the address of the destination computer. The message packet will be sent via the Internet, where the TCP/IP transport protocol will convert the computer name into a more primitive Internet address, which is a 32-bit value that identifies the host's network ID and host ID within the network, e.g., 123.456.7.8. The message packet is then routed to the corporate LAN in Seattle, where a component in the LAN, typically a server, will convert the Internet address into the destination address of the recipient's network interface card, e.g., 00AA00123456.

Meanwhile, the network interface card of the destination computer is designed to continually monitor incoming packets over the network. When the network interface card detects an incoming packet containing its destination address, the network interface card will identify itself as the intended recipient of the packet.

In full power mode communications transmissions occur between two computers automatically and completely invisible to the user. However, efforts are now being made to extend the use of network computing to power management applications, in which one or more of the computers may be operating in a low power mode. In particular, there is increasing demand for power management systems that minimize the energy consumption of computer systems, yet still allow the possibility for receiving remote communications from other computers via a network. These power management systems must provide a mechanism for "waking" a remote computer system from the network in order to receive the communications.

Generally stated, "power management" refers to a computer system's ability to conserve or otherwise manage the power that it consumes. Although power management concerns were originally focused on battery-powered portable computers, these concerns now extend to AC-powered "desktop" computer systems as well. For example, the United States government now provides strong incentives to those in the computer industry to promote energy efficiency in computers.

More particularly, power management refers to the ability to dynamically power down a computer or certain devices when they are not in use, thereby conserving energy. A computer in this condition is referred to herein as being in a "power down" state or condition. Power is then restored to the computer or devices when they are required for use. This process is often referred to as "waking" the computer.

A computer in a power down state may be in a "suspended power state" or a "hibernated power state." In general, a computer in a suspended power state is similar to a computer with all power removed, except that power to memory is maintained and dynamic RAM (DRAM) is refreshed. In addition, the operations of the computer are held in a suspended power state for a suspend operation, whereas the system loses its current operational state on a general power down.

A computer in a hibernated power state is similar to the suspended power state, except that the memory states are written to disk and the entire computer system is shut down.

Although there are several existing power management systems, most are not designed to operate in a network computing environment. Further, those that are designed to operate in a network are limited in their usefulness. For example, in one prior system for waking a computer from a local area network, a remote wake frame or "magic packet" is defined that includes the destination address repeated 16 times somewhere within the packet. While the computer is in the power down state, its network interface card continually monitors all incoming message packets for one that has its destination address repeated 16 times. When the network interface card detects an incoming packet with this address sequence, the network interface card transmits a signal to the operating system to wake the computer.

A significant limitation with this system is that it provides little, if any, security. Anyone with access to the network may send a packet to wake sleeping systems, permitting nuisance attacks where an unauthorized computer wakes systems needlessly on the network.

Attempts to solve the security issues associated with waking a remote computer have focused on using passwords in the magic packet. However, passwords only provide limited protection. Once discovered the password may be used by any computer on the network. An unauthorized system may uncover the password by any number of means, including "brute force" or "sniffing." Brute force password discovery is defined as trying all possibilities until the password is found. Sniffing refers to a machine listening for all packets on the network, including those addressed to other machines. If the sniffed packet is determined to be a magic packet the password is extracted.

Therefore, there is a need for an improved method and system of waking a remote computer on a network where the likelihood of an unauthorized remotely initiated wake up is diminished.

SUMMARY OF THE INVENTION

As will be seen, the foregoing invention satisfies the foregoing needs and accomplishes additional objectives. Briefly described, the present invention provides an improved method and system for remotely waking a client system from a network. In contrast to previous systems, the method and system of the present invention diminishes the likelihood of an unauthorized remotely initiated wake up by employing a transit value.

According to one aspect of the present invention, a method and system of waking a client system that is in a power down state (the "sleeping computer") from a computer network is provided. The sleeping computer includes a network interface card that listens for a particular data sequence. The method and system begin when an incoming data packet is transmitted from one of the remote computers in the computer network to the sleeping computer. When the network interface card detects the incoming packet, it searches the incoming packet for the particular data sequence associated with the sleeping computer. Further, the "transit value," or time-to-live (TTL), in the incoming packet is compared to a predetermined value. The TTL value indicates how far the data packet has traveled through the network, indicating the approximate origin of the data packet. Knowing the approximate origin of the data packet allows the client system to identify if the data packet originated from an external network. The predetermined value represents an origin within the internal network. Accordingly, if the incoming packet contains the particular data sequence associated with the sleeping computer and the TTL matches the predetermined value, then a signal is issued to wake the sleeping computer. Otherwise, the incoming packet is discarded and the sleeping computer is not awakened.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
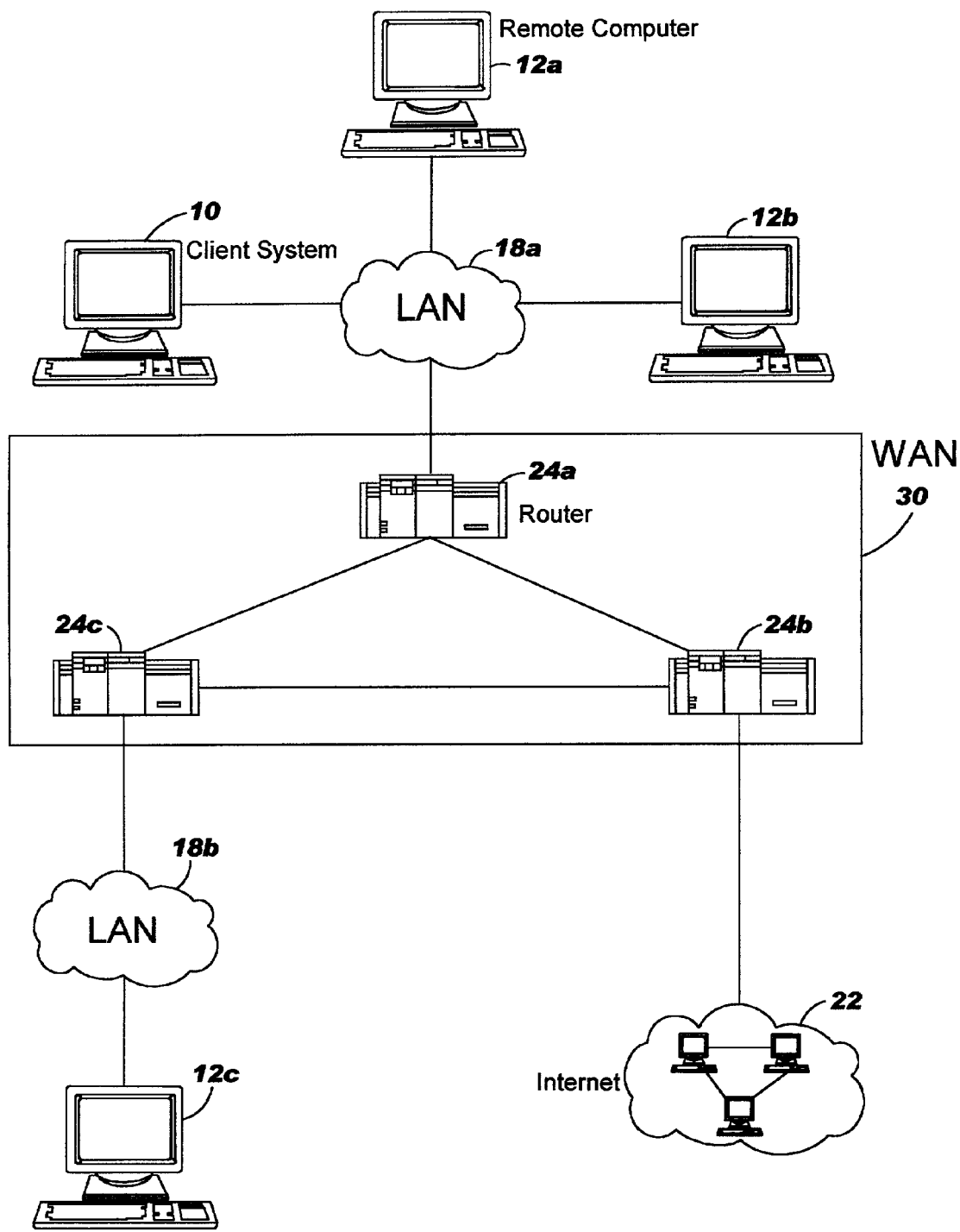
FIG. 1 is a schematic diagram illustrating a network of computers within which the present invention may find application.

Referring now to the drawing figures, in which like numerals indicate like elements or steps throughout the several views, the preferred embodiment of the present invention will be described. In general, the present invention provides an improved method and system for waking a client system from a network. In contrast to previous systems, the present invention described herein diminishes the likelihood of an unauthorized remotely initiated wake up.

FIG. 1 illustrates a schematic diagram of a typical application of the present invention, a client system 10 embodying the system of the present invention, and which executes the steps of the methods described herein. As shown in FIG. 1, the client system 10 is in a networked environment with logical connections to one or more remote computers 12a–c or any machine on the Internet 22. The logical connections between the client system 10 and the remote computers 12a–c or any machine on the Internet 22 are represented by local area networks 18a–b, such as Ethernet, Token Ring, or ARCnet, and a wide area network 30, such as one created by routers 24a–c. It is important to note the wide area network 30 could be composed of a varying number of routers and that local area networks 18a–b could contain a varying number of systems.

The network computing environment depicted in FIG. 1 may be an enterprise network or client/server configuration, in which any one of the remote computers 12a–c may function as a file server or computer server. Alternatively, a peer network environment may also be utilized, in which each of the remote computers 12a–c and the client system 10 can act as both a client and server.

Figure 2:
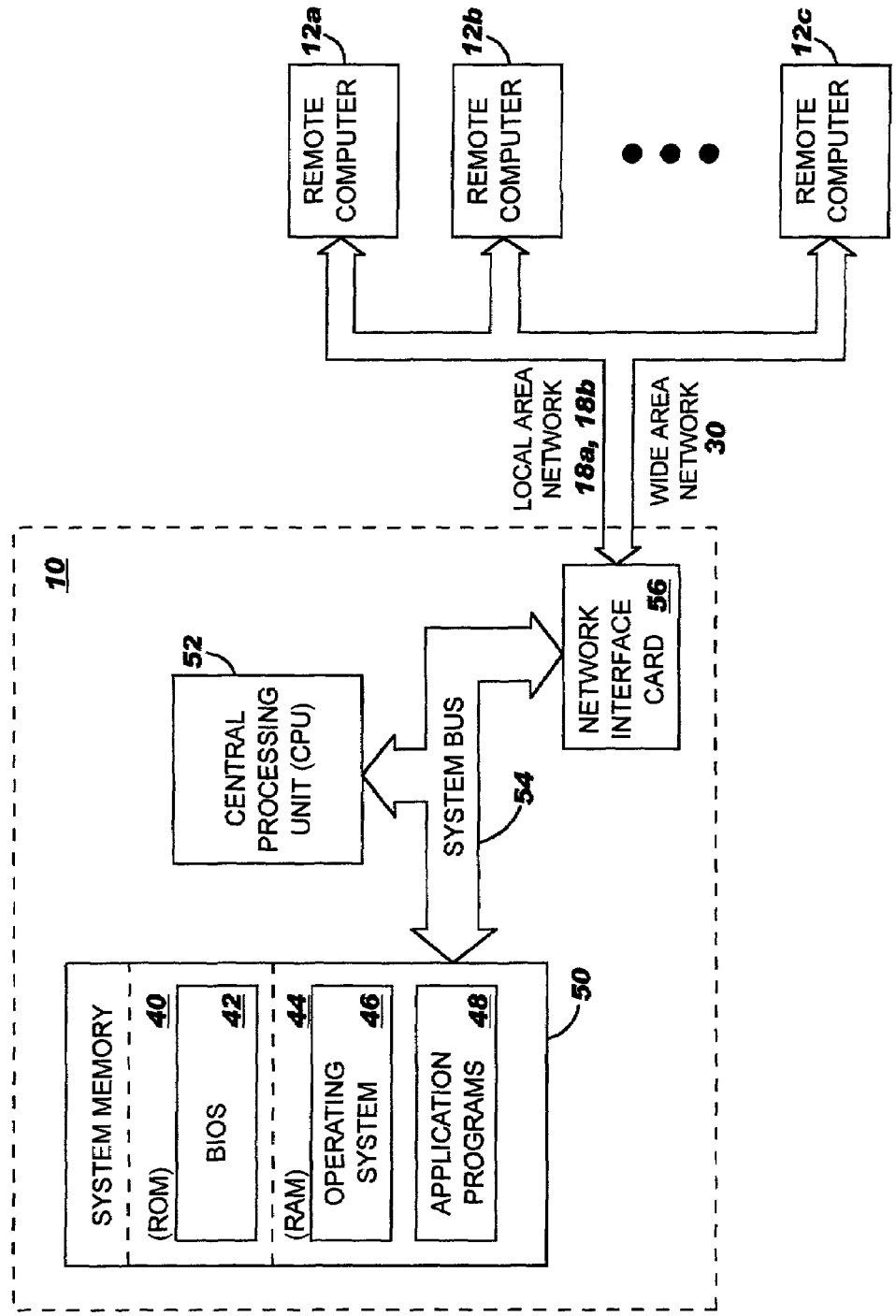
FIG. 2 is a block diagram of the operating environment of a computer within the network of FIG. 1, in accordance with of the preferred embodiment.

Referring to FIG. 1 and FIG. 2, the client system 10, as well as the remote computers 12a–c, also includes at least one network interface card 56 for connecting the hardware of the computers to the local area network 18a–b and/or wide area network 30. CPU 52 operates to execute an operating system 46 and application programs 48 desired by an operator of the system. The operating system 46 and application programs 48 may be stored within RAM 44. BIOS 42 resides in read-only memory (ROM) 40 and is responsible for basic input and output. To simplify the representation of a general purpose computer system, conventional computer components, including computer resources such as direct memory access controller, interrupt controller, and I/O controllers, are not shown. However, it will be appreciated that CPU 52 is connected to conventional computer components via one or more system busses that support communications of control, address, and data signals between the CPU 52 and these standard computer components. Remote computers 64a–c represent machines logically connected to client system 58 such as computer systems connected to the network depicted in FIG. 1.

In one preferred embodiment of the present invention, a method of waking a remote computer from the network is provided. For example, in the diagram shown in FIG. 1, a method is provided whereby any of the remote computers 12a–c may wake the client system 10 via the local area network 18a–b or wide area network 30. Conversely, the client system 10 may utilize the methods and systems described herein to wake any of the remote computers 12a–c.

Figure 3:
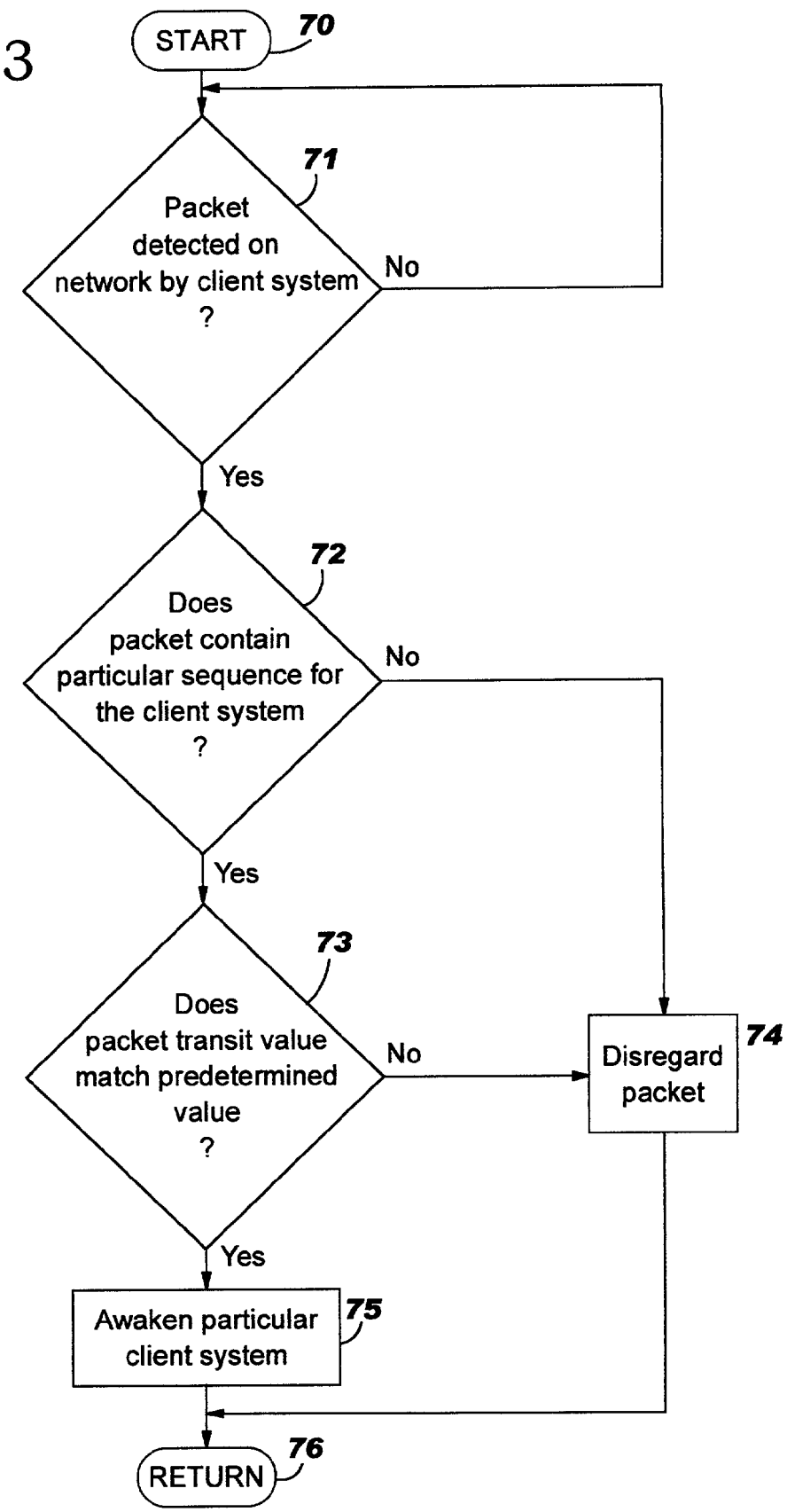
FIG. 3 is a flow chart depicting one preferred set of steps for remotely awakening a computer by another computer on the network.

Referring to FIG. 1, FIG. 2, and FIG. 3, network interface card 56 detects data packets on local area network 18a as illustrated at step 71. Once a packet is detected by network interface card 56, the data packet is examined by network interface card 56 for a particular data sequence associated with client system 10. It is well known in the art how to detect data packets on a LAN and search data packets for a particular sequence. If the data packet contains the particular data sequence associated with client system 10 as depicted at step 72, the data packet transit value is compared to a stored value as illustrated at step 73. The transit value indicates how far the data packet has traveled through the network, indicating the approximate origin of the data packet. Knowing the approximate origin of the data packet allows the client system to identify if the data packet originated from an external network. The predetermined value represents an origin within the internal network. If the stored value and the transit value match, the client system is awakened at step as depicted 75, otherwise the packet is disregarded as illustrated at step 74. Alternatively, the transit value of the packet may be compared before searching for the particular data sequence. Those skilled in the art will appreciate that the comparison of the packet transit value or the particular data sequence could be completed by the BIOS 42, operating system 46, application programs 48, network interface card 56, CPU 52, or any combination thereof. Moreover, one skilled in the art understands that the system may be required to be brought out of low power mode depending on a particular implementation to perform checking. For example, if BIOS 42 is utilized to perform checking the system will power up, compare values in the packet, and power down if there is no match.

The manner of initially communicating to a client system an acceptable transit value may be any method known in the art. For example, a secure transmission or predetermined sequence may be utilized.

Figure 5:
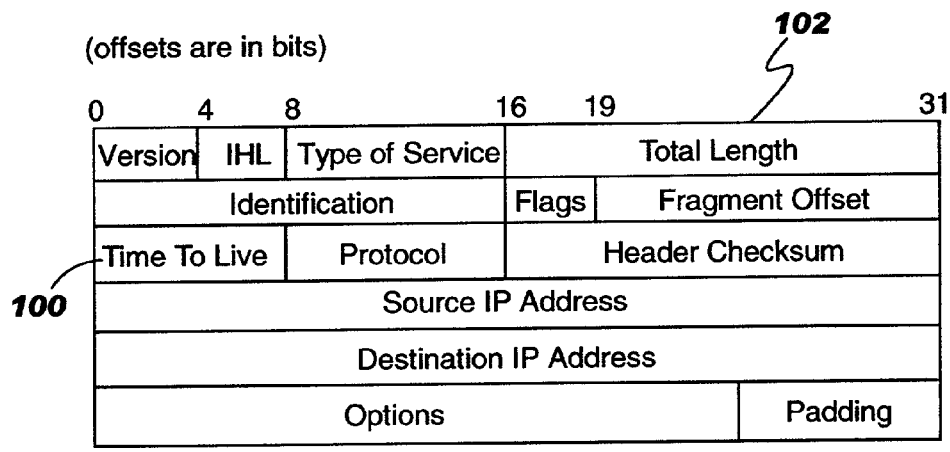
FIG. 5 is another chart illustrating the structure of an IP packet.

In one preferred embodiment of the invention, network interface card 56 examines data packets for a data sequence that repeats client system 10's network address 16 times. Further, the shortest distance between client system 10 and remote computers 12a–c is a known value. Referring now to FIG. 1, FIG. 2, and FIG. 5, the time-to-live (TTL) of the wake up packet is set to 255 by one of the remote computers 12a–c, the maximum value possible, allowing the client system 10 to store the value 255 minus the shortest distance between client system 10 and remote computers 12a–c. Upon detecting the data sequence associated with client machine 10, the network interface card 56 compares the TTL 100 of the IP header 102 of the incoming packet against a stored value in network interface card 56. If the packet contains the client system 10's IEEE address repeated 16 times, and the TTL of the IP header of the incoming packet match the value stored in network interface card 56, the client system is awaken. It is important to note, any transport protocol which implements a feature analogous to a TTL could be used to carry out the spirit of the invention.

In yet another embodiment of the invention, the client system 10 stores multiple values to compare to the TTL. The multiple values account for the various paths which result in different distances from remote systems 12a–c and client system 10. For example, a data packet originating at remote system 12c that travels via routers 24c to router 24a to client system 10 has a path distance of 2, while a data packet originating at remote system 12c that travels via router 24c to router 24b to router 24a to client system 10 has a path distance of 3. Client system 10 checks the TTL to match either of the two possible paths.

Figure 4:
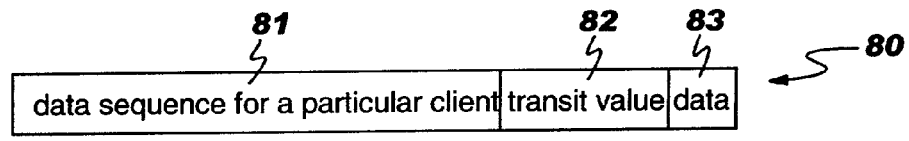
FIG. 4 is a chart depicting the structure of a magic packet.

Those skilled in the art will appreciate that many of the fields in a data packet will include information that is not relevant for purposes of determining whether the packet should be processed by the client system. For example, the source address field that is present in most data packets is typically not of interest. FIG. 4 illustrates the generic form of a data packet for the present invention. The wake up packet 80 contains the particular data sequence 81 for a client system, a transit value 82, and other data 83 which may include information that is not relevant for determining if the client system should be awaken. The order of the data packet elements is not important.

The present invention has been described in relation to particular embodiments which are intended in all respects to be illustrative rather than restrictive. Alternative embodiments will become apparent to those skilled in the art to which the present invention pertains without departing from its spirit and scope. For example, although the present invention has been described in accordance with a remote computer in a power down mode, it will be appreciated that the systems and principles described herein may also be useful in a computer that is operating in full power mode by having the network interface card send an interrupt only when it receives a packet that the computer needs to process. Moreover, the present invention has been described in accordance with waking a personal computer. However, the design described herein equally applies to any other computers, servers, network peripherals or network servers. Accordingly, the scope of the present invention is defined by the appended claims rather than the foregoing discussion.

What is claimed is:

1. A method for remotely waking up a client system within a network which includes a plurality of systems, comprising the steps of:
    detecting a transmitted packet of data which includes a data sequence and a transit value that varies in response to the progress of the packet within said network;
    determining if said data sequence matches a particular data sequence associated with said client system;
    verifying said transit value contained in said transmitted packet of data matches at a predetermined value; and
    waking said client system only in response to determining that said data sequence within said transmitted packet of data matches said particular data sequence associated with said client system and that said transit value contained in said transmitted packet matches said predetermined value wherein the likelihood of an unauthorized remotely initiated wake up is diminished.

2. The method as described by claim 1 wherein said network is further comprised of a plurality of routers which decrement said transit value of said transmitted packet as said transmitted packet progress through said network.

3. The method as described by claim 1 wherein said transmitted packet is an Internet Protocol (IP) packet.

4. The method as described by claim 1 wherein said particular data sequence is a client machine's address repeated sixteen times.

5. The method as described by claim 1 wherein said predetermined value is selected from a plurality of values.

6. The method as described by claim 3 wherein the transit value is a time-to-live (TTL) value stored in said transmitted packet.

7. A system for remotely waking up a client system within a network which includes a plurality of systems, comprising:
    means for detecting a transmitted packet of data which includes a data sequence and a transit value that varies in response to the progress of the packet within said network;
    means for determining if said data sequence matches a particular data sequence associated with said client system;
    means for verifying said transit value contained in said transmitted packet of data matches a predetermined value; and
    means for waking said client system only in response to determining that said data sequence within said transmitted packet of data matches said particular data sequence associated with said client system and that said transit value contained in said transmitted packet matches said predetermined value wherein the likelihood of an unauthorized remotely initiated wake up is diminished.

8. The system as described by claim 7 wherein said particular data sequence is a client machine's address repeated sixteen times.

9. The system as described by claim 7 wherein said network is further comprised of a plurality of routers which decrement said transit value of said transmitted packet as said transmitted packet progress through said network.

10. The system as described by claim 7 wherein said transmitted packet is an Internet Protocol (IP) packet.

11. The system as described by claim 10 wherein said transit value is a time-to-live (TTL) value stored in said transmitted packet.

12. The system as described by claim 7 wherein said predetermined value is selected from a plurality of values.

* * * * *